Figure 1:
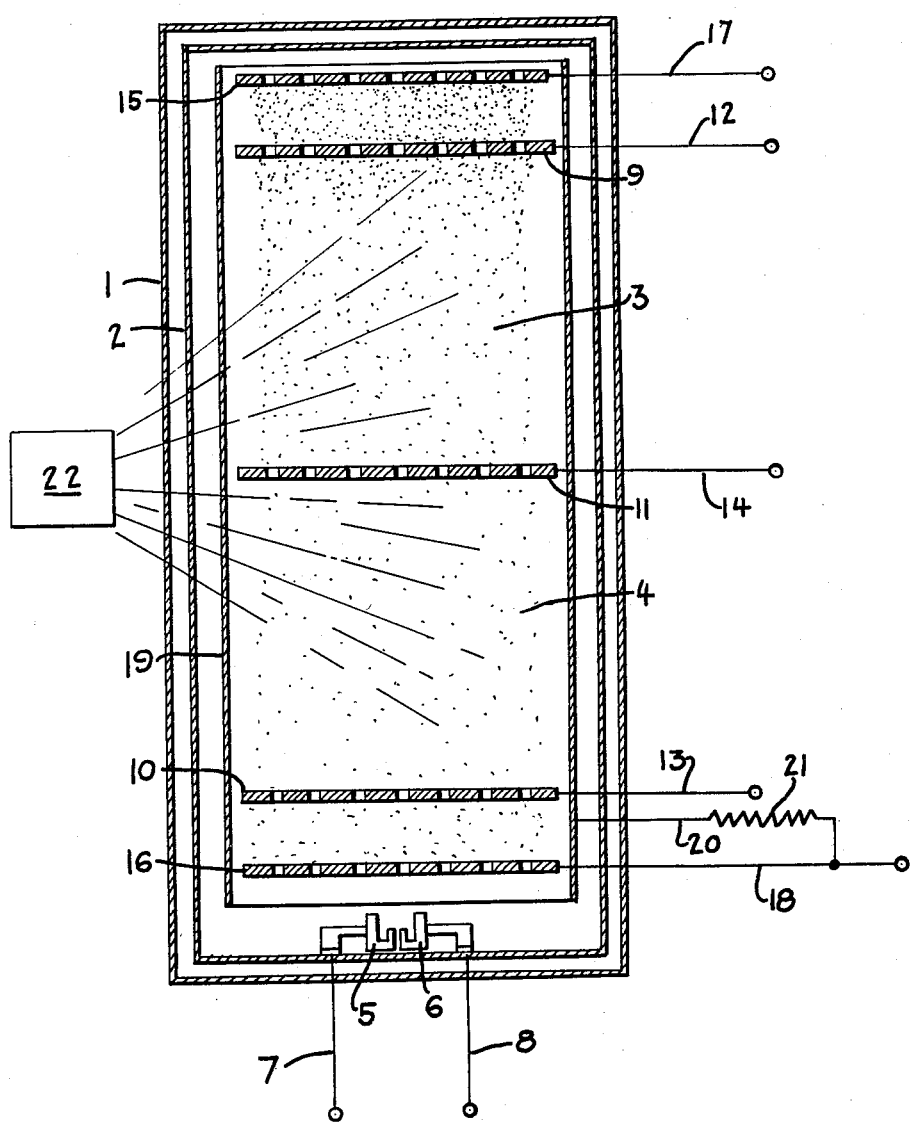

United States Patent Office 3,011,347
Patented Dec. 5, 1961

3,011,347
INSTRUMENT FOR AIRBORNE MEASURING OF DERIVATIVES OF THE VERTICAL COMPONENT OF THE EARTH'S GRAVITY FIELD
Boyd D. Boitnott, Rte. 1, Box 190, Cypress, Tex.
Filed Oct. 1, 1957, Ser. No. 687,548
13 Claims. (Cl. 73—382)

This invention relates to an instrument for and method of airborne measuring of derivatives of the vertical component of the earth's gravity field and has for an object to provide such an instrument which eliminates, in itself and in its use, mechanical supports, suspensions, or the like, for the actively operating elements, thereby avoiding the presence of tendencies for the build up or intrusion of spurious magnetic or electric disturbances such, for instance, as parasitic oscillations.

Another object consists in providing such an instrument which employs a multitude of particles that are sensitive to the effect of gravity changes and are enclosed within the instrument in such manner that they may descend when subject to gravitational pull and their rate of descent be taken as a measure of the gravitational force acting upon them.

Another object consists in employing as the just mentioned particles droplets composing a small cloud, or the like, formed from a vaporizable substance, such, for instance, as mercury.

Another object consists in providing the instrument with means, preferably electric, for effecting the just mentioned vaporization; and also providing means, preferably electric, for measuring the rate of descent of the droplets by utilizing vertically spaced electrode grids, or the like, placed within the path of descent of the droplets and determining the static potentials developed per unit of time upon the grids by the droplets.

Another object consists in providing means, preferably electric, for reversing the movement of the droplets, causing them to rise instead of fall, in order that the measuring function of the instrument may be constantly repeated as desired, or slowed in its action.

Another object consists in providing an embracing electrode, or the like, which surrounds the droplets and the above mentioned grids, for the purpose of maintaining the cloud of droplets in desired formation, e.g. a narrow vertical beam, and also inhibiting any effect upon the instrument of the horizontal vectors of gravity.

Another object consists in providing an evacuated chamber to contain all the above mentioned elements to the end that they may operate in a vacuum free from any air effects.

Another object consists in providing a suitable source of radio activity which causes its rays to impinge upon and ionize the droplets so that they may properly react with the electrical elements of the instrument by establishing or increasing the conductivity of the cloud of droplets.

Another object consists in providing means for recording the above stated measurements graphically, or otherwise, or noting the same by indication to a human sense, e.g. hearing.

Another object consists in providing such an instrument which operates automatically and efficiently devoid of the opportunity for the involvement of human error, such for instance, as might be entailed by the necessity of mathematical calculation which is eliminated by this invention.

A further object is to provide certain improvements in the form, construction, arrangement, and material of the several elements of the instrument, and in the steps of the method of procedure in determining and recording the significant measurements, whereby the above named objects and others inherent in the invention may be efficiently attained.

In brief summary, the invention comprehends an instrument of the character above reflected which is designed for airborne geophysical exploration of the gravitational type and is competent automatically and directly to detect, measure, and record derivatives of the vertical component of the earth's gravity field, the said instrument embodying a vacuum chamber in which is established a cloud of droplets from a vaporizable substance, such as mercury; the said droplets being responsive to the pull of gravity and in their fall cooperating with a plurality of vertically spaced electrode grids, or the like, to measure variations in the vertical gradient of the earth's gravity field as the instrument is flown above selected terrain. Reversing electrodes are also incorporated to enable repeated measurements by causing the droplets to move upwardly and then be permitted to fall again and again; which electrodes may also be used to slow the movement, if desired. An embracing electrode serves to maintain the preferred cloud formation of the droplets, and also to protect the instrument from the force of the horizontal vectors of the gravity field. The operative elements are connected in an appropriate electrical circuit which also produces a record of the measurements, while a suitable source of radio activity ionizes the droplets to augment their conductivity and better their cooperation with the electrodes. The walls of the chamber are desirably of glass in double with an intervening vacuum space which tends to a minimum of diffusion of gases from the wall material into the droplets. It will be clear that the cloud of droplets is, inherently, free of mechanical support, which is of notable value in eliminating generation of spurious magnetic and electric factors such, for instance, as parasitic oscillations.

Figure 2:
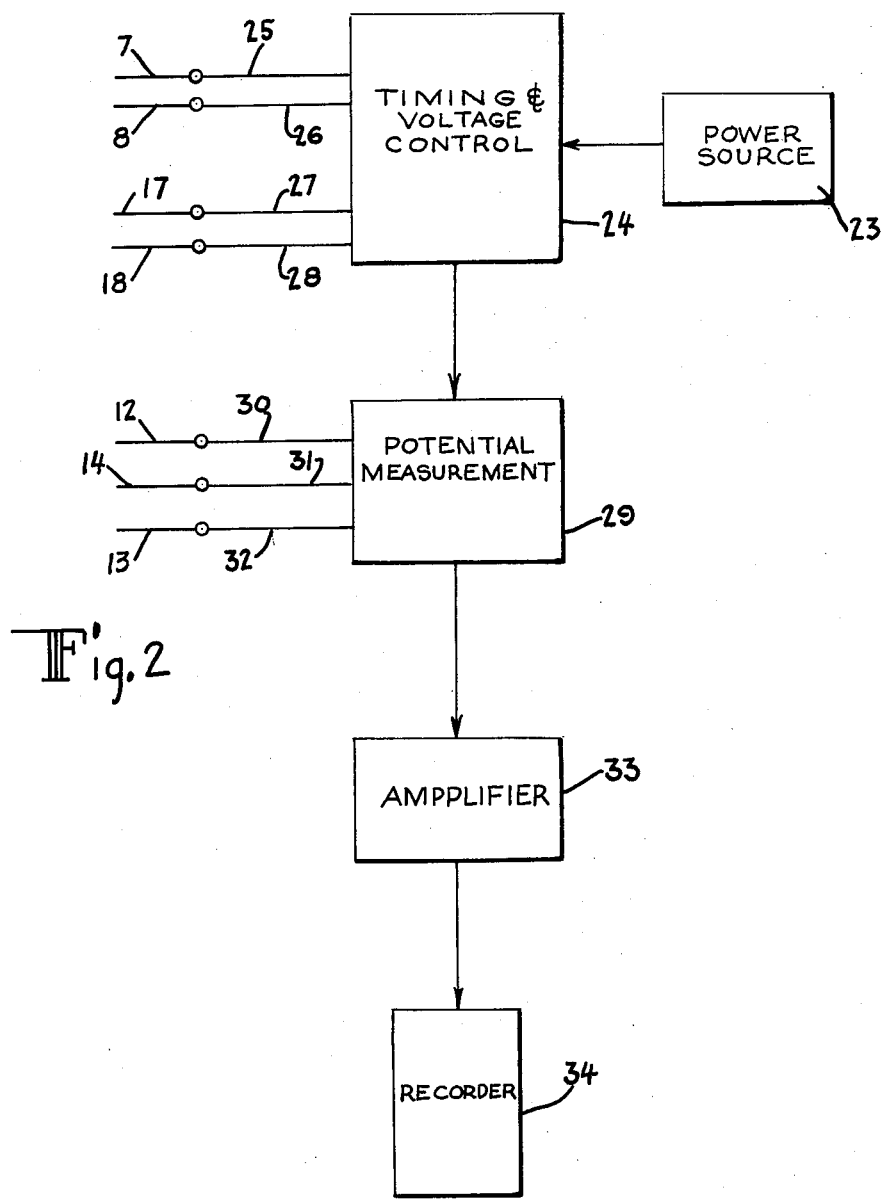

A practical embodiment of the invention is represented in the accompanying drawings, in which FIG. 1 represents a vertical section through the instrument, partly diagrammatic; and FIG. 2 represents a schematic layout of the electrical controlling and recording means.

For a long time there has been a general understanding among geophysicists that anomalies in the earth's sub-surface structure and substance are frequently indicative, directly or indirectly, of the existence and approximate location of valuable mineral deposits, such as oil, gas, and ores; and sometimes, indeed, of the actual size and character of the deposits themselves. This knowledge may be said to have constituted the basis of geophysical exploration, and one aspect of the significant anomalies involves gravitational conditions which are related to or reflective of variations in density. Accordingly, the professional practice of geophysical exploration has included, as one of its branches, measurement of the earth's gravity field, and/or one or more components thereof, and/or gradient changes therein. Various instruments have been devised and put to use in this connection, such as those of the pendulum and torsion balance type, as well as the gravimeter, all of which operate from fixed positions on the earth's surface.

It has been discovered and recognized that it is possible to ascertain the vertical gradient of gravity through successive measurements with the gravimeter placed at different elevations in a support positioned on the ground, and a modern presentation of this procedure, with its attendant difficulties in operation and uncertainties in results, together with recital of pertinent antecedent experiments, is found in an article by Stephen Thyssen-Bornemisza and W. F. Stackler, published in Geophysics, vol. XXI, pp. 771–779, July 1956.

The factor of topography is one that with great frequency intrudes upon exploration conducted on the earth's surface, and such features as dense forests, heavy undergrowth, marshland, streams, and rough hills, among many, can present almost insuperable barriers to practical operations or, at least, involve great delays and expense. An attempt to escape these impediments was made by C. A. Heiland, as disclosed in U.S. Patent No. 2,626,525, issued January 27, 1953. He proposed to make gravimetric investigations of areas "regardless of the character of the surface topography" and to detect gravitational anomalies "in regions which would otherwise be inaccessible, such as swamps, jungles and the like." The plan was to carry a gravimeter to desired points by helicopter or blimp and lower the instrument by cable to the ground. The instrument was supported in a skeleton tripod fitted with spikes and was sufficient in weight so that the spikes entered the earth and held the instrument in position while also serving as an anchor for the aircraft. Means for automatic leveling and dial reading of the gravity measurement were embodied in the apparatus "so that, when the instrument is subsequently hoisted back onto the aircraft, that reading may be taken off by the observer." It is pointed out in the patent that the gravity reading would be without value unless means were provided for determining accurately the elevation of the station, and two forms of such means are suggested, one telescopic and "somewhat complicated," and the other "less accurate but more rapid" involving the use of radio transmitters at two or more ground stations. Gravity measurements thus achieved are repeated "at desired places" in the area being explored, the instrument being transported by air from station to station and the measurements being taken on the ground. The patent does not explain how topographic hindrances to the lowering of the instrument to the earth, e.g., dense forests or other vegetable growth; or difficulties in ground support and leveling of the instrument, e.g., swamps and rocks; are overcome.

In the gravity field vector the horizontal and vertical components are very unequal, the latter, in fact, being almost equal to the total vector, and it has become an accepted fact that gradient measurements, as distinguished from absolute measurements, and, particularly, vertical gradient measurements, afford the more significant data with respect to the pursuit of geophysical exploration for mineral deposits. The vertical gradient is the first derivative of the field in a vertical direction, and equations expressive of this derivative as well as of the second derivative are familiar to those engaged in this professional activity. The said derivatives, emphatically, have the inherent virtue of readily providing detailed information of value but, until recently, it has been necessary to compute the said derivatives from data obtained by direct observations conducted on the ground by well known instruments for measuring gravity, such as the torsion balance, pendulum, or gravimeter hereinabove mentioned. This procedure involves not only the cumbersome and time consuming work previously explained, but also extensive mathematical calculations that are inevitably vulnerable to human error; while the equations and formulae which have been established for use in the calculations are recognized as merely approximate. See articles by Thomas A. Elkins in Geophysics, vol. XVI, pp. 29–50, January 1951; by Otto Rosenback in Geophysical Prospecting, vol. II, No. 1, pp. 1–23, March 1954 and June 1954, pp. 128–138; and by Herman A. Ackerman and C. Hewitt Dix in Geophysics, vol. XX, No. 1, pp 148–154, January 1955. These writings are thought clearly to demonstrate that derivatives of the vertical component of the gravity field, i.e., functions of the vertcial gradient of the said component, are significantly informative of gravity measurements with respect to geophysical exploration for mineral deposits in the earth, but that the said derivatives have theretofore been determined only by cumbersome and slow procedure on the ground or by mathematical calculation from instrumental gravity measurements, which calculations have been not only extensive and subject to human error, but have also been founded on "approximate" formulae.

Under date of November 27, 1956, I filed an application for patent in the U.S. Patent Office, having Serial No. 624,623, and entitled Instrument for and Method of Airborne Geophysical Exploration, which application disclosed means for automatically detecting and continuously recording variations in the gradient of the vertical component of the earth's gravity field, i.e., a derivative of the said field; the detecting and recording being accomplished while the apparatus is air flown over the area under investigation for mineral deposits, thus overcoming the disadvantages of previous developments explained above. While the present invention departs emphatically from that of the said application Ser. No. 624,623, it may, in a sense, be regarded as an improvement upon or over a further development thereof.

Referring specifically to the embodiment of the invention represented in the drawings, an enclosing double walled chamber has its outer and inner walls denoted respectively by 1 and 2. It is preferably composed of glass and in the space between the walls is created a vacuum, which construction is of value as it minimizes diffusion of occluded gases from the wall material into the cloud of vapor within the chamber, due to pressure and temperature effects, and thus avoids contamination of the cloud droplets. The chamber need not be of large size, a height between six inches and one foot proving adequate, and the proportion of width to height shown in the drawing being satisfactory. A cylindrical shape is desirable.

Within the chamber 1, 2, is deposited a quantity of vaporizable substance sufficient, when vaporized, to form a cloud substantially filling the chamber. Mercury has been determined to be eminently efficient, but other substances, such as oil, or even water, would be functionally operative. The substance is shown as in cloud or vapor phase in FIG. 1, and it is given two reference numerals, the upper portion being marked 3 and the lower 4, for a reason that will be apparent in a later part of this description.

An electric vaporizer, consisting of electrodes 5 and 6, is positioned within and at the bottom of the chamber, the electrodes being connected to a suitable source of voltage power, such, for instance, as a battery or the properly regulated output of a generator, by wire leads 7 and 8 respectively.

Three electrode grids, all preferably alike, are fixed, in any suitable manner, within the chamber 1, 2. One near the top thereof is denoted by 9; one near the bottom by 10; and one in the middle by 11. The said electrodes are each electrically connected to the source of power by their respective leads 12, 13 and 14. Two more electrodes are also appropriately fixed in the chamber 1, 2; one, marked 15, above the electrode 9, and the other, marked 16, below the electrode 10. Each of these has its lead, 17 and 18 respectively, to the source of power. Their function is to reverse the fall of the particles composing the cloud 3, 4, or to slow the operation of the instrument, as will hereinafter be explained. The composition and construction of all these electrodes is conventional and need not be detailed as such matters are fully within the knowledge of those in the electrical industry.

An embracing, preferably screen like, electrode 19 is also suitably fixed within the chamber 1, 2. It is desirably cylindrical in form and surrounds all the previously named electrodes. This electrode 19 should be composed of a substance possessed of good electric conductivity but non-magnetic, e.g. copper. The duty of this element is to control the form of the cloud 3, 4, and also to inhibit effects of the horizontal vectors of the earth's gravity field. This electrode 19 has a conducting lead 20 which connects with the lead 18 of the electrode 16, but a resistance 21 is interposed in the lead 20 so that, while the said two electrodes may be charged with potentials of the same sign, the potential of 19 is lower than that of 16.

Positioned exteriorly of the chamber 1, 2, at one side thereof and preferably at about an equal distance from the top and bottom of the chamber, is a suitable source of radio activity, e.g. radium, 22, capable of ionizing the particles or droplets composing the clouds 3 and 4, with the effect of sufficiently enhancing their electric conductivity so that they respond fully to the electric forces of the control system.

FIG. 2 of the drawings sets forth a block diagram of the electrical control system with its connections to elements illustrated in FIG. 1. Thus, the source of voltage power is denoted by 23 and a legend. It is operatively electrically connected to an appropriate instrument 24 for timing and voltage control which is of a construction well known to those in the electrical industry and obtainable in the open market, e.g. an adjustable rotary timing switch with a rheostat for voltage control. This instrument 24 has leads 25 and 26 which connect with the wires 7 and 8 of the vaporizer 5, 6; and also leads 27 and 28 to the electrodes 15 and 16. It serves to synchronize the potential output with the timed input voltages; and is electrically connected to another instrument 29 for potential measurement which has wires 30, 31, and 32 extending to the electrodes 9, 11 and 10, respectively. The last named instrument, which could be a voltmeter or a voltage bridge, is in operative connection with an amplifier 33 of any appropriate type which increases the signals fed to the recorder 34. Graphic recording, as by oscillograph, or tape recording, are preferred, but monitoring through ear phones may be substituted, if desired.

It should be noted that, since the time duration in the sequence of input voltage may be altered by adjusting the timing rate, the output frequency will vary accordingly. Thus it may be necessary to synchronize or match the potential measuring device with the output, especially in view of the wave shape that is obtained at low frequencies, say, twenty cycles per second.

In constructing the instrument, the parts are assembled as indicated in FIG. 1, including the chamber 1, 2, with its vacuum walls. Air is exhausted from the chamber in any convenient manner, and the latter is then sealed. The wire leads from the elements within the chamber are rendered air tight by appropriate steps, and the electric control system represented in FIG. 2, is connected as explained above. It may be arranged in a suitable cabinet, if desired. The portion of the instrument shown in FIG. 1, except the source of radio activity, is vertically stabilized in any well known and approved manned, e.g. gyroscopically, though free suspension is generally satisfactory. This serves to eliminate dispalcements due principally to motions of the air craft carrying the instrument which could otherwise hamper its precision.

In operation, a switch, or the like, is moved so that a potential is fed to the vaporizer 5, 6, from the voltage source 23. This causes vaporization of the charge of mercury and the cloud 3, 4, of particles or droplets fills the chamber 1, 2, within the embracing electrode 19. The current supply to the vaporizer is now broken and the particles or droplets, being subject to the influence of gravity, descend. Their rate of descent is dependent upon the vertical gravitational force acting upon them, and the rate is measured by the electrodes 9, 10 and 11, because the said rate is proportional to the static electric potentials developed per unit of time upon the said electrodes by the droplets which are ionized by the rays from the source of radio activity 22. The measurement just mentioned is performed automatically and so recorded by the system represented in FIG. 2, and above described. The provision of the three electrodes 9, 10, and 11, results in the cloud being divided (so to speak) into upper and lower portions marked 3 and 4, so that there is measurement of the vertical gravitational force in each said portion of the cloud, whereby the vertical gradient of gravity is the difference between the static potential developed upon electrode 11 and that upon electrode 10, per unit of time as above expressed, and the said measurements are representative of derivatives of the vertical gradient of the earth's gravity field and are so recorded.

Following each measurement, opposite potentials are automatically applied to the electrodes 15 and 16 which entails a reversal of movement of the particles or droplets, so that they rise against the gravitational force to their original positions. Then, momentarily all potentials from the voltage source are interrupted, following which the measurement cycle is again activated. The rapidity of change from cycle to cycle may be controlled by the potentials applied to electrodes 15 and 16. The free falling period of the droplets is short, e.g., one sixtieth to one twentieth of a second.

The bottom electrode 16 and the embracing electrode 19, are both charged with potentials of the same sign, though the potential of 19 is of lower value due to the effect of resistance 21, and this use of potentials of the same sign insures the holding of the cloud of droplets centered within the electrode 19 in a sort of narrow vertical column or beam to insure proper and accurate effects upon the electrodes 11 and 10.

As the instrument is flown over terrain being explored, the particles or droplets will be subject to the force of the vertical component of the earth's gravity field but the strength of the gravity effect upon the portion of the cloud above electrode 11 (marked 3) will differ from that upon the lower portion (marked 4) owing to the different vertical positions of the two said portions. When the instrument passes over a gravitational anomaly in density the result will be to vary the rate of descent of the particles or droplets and, consequently, to vary their development of static potentials upon the electrodes 11 and 10 per unit of time, the difference between this effect upon the electrode 11 and the electrode 10, being, as previously stated, indicative of the gradient of the vertical gravity component expressed in derivative terms.

Turning now to a general recital of the method of use of the instrument; it is mounted or supported in or on or carried by an air craft in such manner as to be automatically vertically stabilized against all motions of the craft including changes in speed. The particular type of craft is not of controlling importance, but a comparatively slow flying airplane has been found to meet all requirements. The terrain selected for exploration is traversed by the plane in fairly closely spaced (e.g., five hundred feet to one-half mile) approximately parallel flights at a chosen altitude (e.g., five hundred to three thousand feet), generally followed by similar flights at substantially right angles to those previously made, preferably north-south flights followed by east-west. The variations in the gradient of the vertical component (i.e., a derivative) of the earth's gravity field detected by the instrument during the flights are either continuously recorded e.g., graphically, or on tape, or carefully monitored with appropriate notations. Correlation of the recordings with the terrain from which the signals are received should, of course, be accurately maintained in any preferred manner (e.g. photographic, by radio, or otherwise), several being now well understood by those experienced in magnetic aerial geophysical exploration. By plotting the records thus obtained, a pattern of the significant vertical gravity component gradient variations is developed which may be interpreted directly within the skill of geophysicists.

This instrument will perform with satisfaction when airborne even under fairly turbulent conditions, which may be defined as thrust force not greater than one and one quarter times the normal gravitational force; and in the event that the turbulence exceeds the operative tolerance of the instrument, the fact will at once become known to the operator so that he may obviate continuance of unreliable recording. Furthermore, such excessive turbulence will have no injurious effect upon the instrument.

While its complete adaptability to aerial exploration is an outstanding characteristic feature of this instrument, the fact should also be made clear that it is likewise well suited to ground operations in which the previously explained inherent advantages, as compared with developments prior to my above named patent application Serial No. 624,623 (e.g. elimination of mathematical calculations), would be of meritorious importance. Accordingly, some claims are presented directed to the instrument itself, without reference to a particular type of gravitational exploration.

As previously pointed out, while mercury is the preferred vaporizable substance, others may be substituted; but mercury possesses a distinct advantage due to its characteristic specific gravity. It should also be noted that more than three electrodes, corresponding to 9, 10 and 11, may be employed thus, in effect dividing the cloud in the chamber 1, 2, into more than two portions 3 and 4; or indeed, a plurality of the chambers 1, 2, vertically positioned one above another, could be combined in one instrument.

It is desired to be understood that various changes may be made in the form, construction, arrangement and materials of the several parts of the instrument, and in the steps of the method followed in its use, without departing from the spirit and scope of the invention; and hence, I do not intend to be limited to details herein shown or described except as the same may be included in the claims or be required by disclosures of the prior art.

What I claim is:

1. An instrument designed and adapted for airborne measuring of a derivative of the vertical component of the earth's gravity field comprising, a chamber, a multitude of electrically conductive particles that are sensitive to the effect of gravity enclosed within the chamber, means for causing the particles to assume a cloud-like formation, electric means also within the chamber adapted to be affected by the movement of the particles, and means for measuring the rate of descent of the particles under variations in gravity pull by determining their effect upon the said electric means.

2. An instrument as defined in claim 1, in which the means for determining the effect of the particles upon the electric means determines the potentials developed upon said electric means per unit of time.

3. An instrument as defined in claim 2, in which the electric means includes a plurality of vertically spaced electric elements.

4. An instrument as defined in claim 1, which also includes means for intermittently causing the particles to rise and then permitting them to fall.

5. An instrument as defined in claim 4, in which the means for causing the particles to rise includes electric elements positioned adjacent the top and bottom of the chamber and means for applying opposite potentials to said elements.

6. An instrument as defined in claim 1, in which the chamber is evacuated.

7. An instrument as defined in claim 6, in which the chamber has evacuated walls.

8. An instrument as defined in claim 1, which also includes means for enhancing the electric conductivity of the particles.

9. An instrument as defined in claim 8, in which the means for enhancing the electric conductivity of the particles includes a source of radio activity positioned exteriorly of the chamber.

10. An instrument designed and adapted for airborne measuring of a derivative of the vertical component of the earth's gravity field comprising, a chamber, a vaporizable substance within the chamber, means for vaporizing the substance into a cloud like formation, and means for measuring the rate of descent of the particles composing the cloud under variations in gravity pull.

11. An instrument as defined in claim 10, which also includes means for causing the cloud to assume and maintain a predetermined shape.

12. An instrument as defined in claim 11, in which the last named means includes a cloud embracing electrode.

13. An instrument as defined in claim 12, in which the said last named means also includes an electrode adjacent the lower portion of the embracing electrode, and means for charging both said electrodes with potentials of the same sign.

References Cited in the file of this patent

UNITED STATES PATENTS

| | | |
|---|---|---|
| 1,780,952 | Symmes | Nov. 11, 1930 |
| 2,628,787 | Payne | Feb. 17, 1953 |
| 2,649,707 | Donath et al. | Aug. 25, 1953 |
| 2,662,185 | Robinson et al. | Dec. 8, 1953 |

FOREIGN PATENTS

| | | |
|---|---|---|
| 571,613 | Great Britain | Aug. 31, 1945 |